United States Patent
Van Den Braber et al.

(10) Patent No.: US 11,386,808 B2
(45) Date of Patent: Jul. 12, 2022

(54) MODEL GENERATION FOR DENTAL SIMULATION

(71) Applicant: Nissin Dental Products Inc., Kyoto (JP)

(72) Inventors: Niels Van Den Braber, Lelystad (NL); Mark De Greef, Koog aan de Zaan (NL)

(73) Assignee: Nissin Dental Products Inc., Kyoto (JP)

(*) Notice: Subject to any disclaimer, the term of this patent is extended or adjusted under 35 U.S.C. 154(b) by 658 days.

(21) Appl. No.: 16/083,493

(22) PCT Filed: Mar. 2, 2017

(86) PCT No.: PCT/EP2017/054959
§ 371 (c)(1),
(2) Date: Sep. 8, 2018

(87) PCT Pub. No.: WO2017/153259
PCT Pub. Date: Sep. 14, 2017

(65) Prior Publication Data
US 2019/0066537 A1      Feb. 28, 2019

(30) Foreign Application Priority Data
Mar. 10, 2016   (GB) .................................. 1604155

(51) Int. Cl.
*G09B 23/28*      (2006.01)
*G06T 17/20*      (2006.01)
(Continued)

(52) U.S. Cl.
CPC ............ *G09B 23/283* (2013.01); *G06T 15/08* (2013.01); *G06T 17/00* (2013.01); *G06T 17/20* (2013.01); *G06T 2210/41* (2013.01)

(58) Field of Classification Search
CPC .... G09B 23/283; G06T 17/20; G06T 2210/41
See application file for complete search history.

(56) References Cited

U.S. PATENT DOCUMENTS 8,716,973 B1    5/2014 Lammertse
9,586,364 B2 *  3/2017 El-Siblani ............. B29C 64/393
(Continued)

FOREIGN PATENT DOCUMENTS

EP    2289458 A2     3/2011
JP    2005199084 A   7/2005
(Continued)

OTHER PUBLICATIONS

Wu, Jun, et al., Voxel-Based Interactive Haptic Simulation of Dental Drilling, Proceedings of the ASME 2009 International Design Engineering Technical Conferences & Computers and Information in Engineering Conference, DETC2009-86661, 2009.

(Continued)

*Primary Examiner* — David T Welch
(74) *Attorney, Agent, or Firm* — Kenja IP Law PC

(57) ABSTRACT

A computer-implemented method of generating a 3D model for dental simulation, comprising reading a file describing the surface of a 3D object having a volume; generating a voxel grid encompassing the 3D object, wherein the voxel grid contains a plurality of voxels; identifying a subset of voxels of the plurality of voxels which are located within the volume of the 3D object; generating a triangulated surface, wherein the triangulated surface encompasses the subset of voxels and defines the outer surface of the 3D model; assigning a density value to each voxel in the subset of voxels, wherein the subset of voxels defines the solid volume of the 3D model.

11 Claims, 9 Drawing Sheets

(51) Int. Cl.
*G06T 17/00* (2006.01)
*G06T 15/08* (2011.01)

(56) References Cited

U.S. PATENT DOCUMENTS

| | | | |
|---|---|---|---|
| 2002/0119432 A1* | 8/2002 | Ranta | G09B 23/28 434/263 |
| 2008/0085489 A1* | 4/2008 | Schmitt | G16H 50/50 433/75 |
| 2008/0088620 A1 | 4/2008 | Shih et al. | |
| 2008/0182220 A1* | 7/2008 | Chishti | A61C 7/08 433/24 |
| 2008/0248443 A1* | 10/2008 | Chishti | A61C 7/08 433/24 |
| 2009/0110141 A1* | 4/2009 | Stayman | H04N 5/32 378/19 |
| 2009/0162813 A1 | 6/2009 | Glor et al. | |
| 2009/0248184 A1* | 10/2009 | Steingart | G06F 3/016 700/98 |
| 2009/0316966 A1* | 12/2009 | Marshall | A61B 6/5217 382/128 |
| 2010/0119996 A1* | 5/2010 | Kaigler, Sr. | A61C 13/0013 433/215 |
| 2012/0064489 A1* | 3/2012 | Rubbert | A61C 8/0006 433/175 |
| 2012/0065755 A1* | 3/2012 | Steingart | B33Y 30/00 700/98 |
| 2014/0329194 A1 | 11/2014 | Sachdeva et al. | |
| 2015/0145177 A1* | 5/2015 | El-Siblani | B29C 64/129 264/497 |
| 2015/0254816 A1* | 9/2015 | Carlson | A61B 6/4085 382/131 |
| 2016/0180485 A1* | 6/2016 | Avila | G06K 9/6201 382/154 |
| 2016/0374784 A1* | 12/2016 | Joshi | A61C 13/082 433/214 |
| 2018/0147015 A1* | 5/2018 | She | G06T 5/002 |
| 2019/0046276 A1* | 2/2019 | Inglese | A61C 9/0046 |

FOREIGN PATENT DOCUMENTS

| | | |
|---|---|---|
| JP | 2012094128 A | 5/2012 |
| WO | 2004/098378 A2 | 11/2004 |
| WO | 2008/066891 A2 | 6/2008 |
| WO | 2015/170162 A1 | 11/2015 |

OTHER PUBLICATIONS

Abe, Tetsuo, et al., Extension of Cutting and Visualization Functions of Personal Computer-Based Tooth-Cutting Simulator, Decs/1, Institute of Electronics, Information and Communication Engineers (IEICE) technical report, vol. 99, No. 493, Japan, Dec. 11, 1999, MBE99-118 (Dec. 1999), pp. 23-30.

Abe, Tetsuo, et al., A Trial System of Solid Model-Based Real-Time Tooth Cutting Simulator, Decs/1, Institute of Electronics, Information and Communication Engineers (IEICE) technical report, vol. 98, No. 672, Japan, Mar. 19, 1999, MBE98-146 (Mar. 1999), pp. 41-48.

Logozzo, Silvia et al., "Recent advances in dental optics—Part 1: 3D intraoral scanners for restorative dentistry", Optics and Lasers Engineering, vol. 54, Mar. 2014, pp. 203-221, abstract p. 205.

Parle, Dattatraya et al., "3D Modeling and Stress Analysis of Premolartooth Using FEA", 2012, pp. 1-9.

Sep. 27, 2021, Notification of material filed by a third party issued by the IP Australia in the corresponding Australian Patent Application No. 2017229154.

Ben Anderson, An Implementation of the Marching Cubes Algorithm, published online on Mar. 14, 2005, retrieved on Aug. 24, 2021, from URL: https://web.archive.org/web/20060918200923/http://www.cs.carleton.edu/cs_comps/0405/shape/.

Leif P. Kobbelt et al., Feature Sensitive Surface Extraction from Volume Data, SIGGRAPH '01:Proceedings of the 28th annual conference on Computer graphics and interactive techniques, Aug. 2001.

Phattanapon Rhienmora et al., Development of a Dental Skills Training Simulator Using Virtual Reality and Haptic Device, NECTEC Technical Journal, Jan. 2008.

Sep. 2, 2021, Communication of a notice of opposition issued by the European Patent Office in the corresponding European Patent Application No. 17708497.7.

Sep. 16, 2021, Communication of notices of opposition (R. 79(1) EPC) issued by the European Patent Office in the corresponding European Patent Application No. 17708497.7.

Dec. 21, 2021, Office Action issued by the China National Intellectual Property Administration in the corresponding Chinese Patent Application No. 201780016451.6.

\* cited by examiner 542  544  543

542  543

642  643

770 700

MODEL GENERATION FOR DENTAL SIMULATION

FIELD OF THE INVENTION

The present invention relates to the generation of 3D models, and, more specifically, the generation of 3D models for use in dental simulation.

BACKGROUND TO THE INVENTION

Machines to simulate dentistry techniques for training purposes are known and include, for example, the Simodont machine manufactured by the applicant. These machines implement virtual reality techniques to allow a student to practice various dentistry procedures. The simulation machines generally comprise a display screen which outputs 3D images for viewing by the user wearing 3D glasses. Positioned below the display screen is at least one hand piece which is fixed to the machine by a mechanism comprising a series of linkages and electric motors. The relative position of the hand piece (as it is moved by the user) and the force applied by a user is measured as the user conducts a dentistry operation (for example, drilling into a tooth) on a virtual 3D model of a tooth, set of teeth or jaw. The hand piece simulates a dentist's drill and provide haptic feedback to the student as the student performs their drilling.

Dental simulation machines provide a simulation environment for trainee dentists before they are required to perform the same techniques on a real, rather than a virtual, tooth. Patient safety is very important. The more realistic the 3D model, the smoother the student's transition from practicing on the dental simulation machine to performing dentistry on a real patient.

Typically, the 3D model is artificially constructed. Different models are designed for different training requirements and situations—for example, a particular model may be of a chipped tooth (which the student is required to fix in a simulated training scenario). Other models may exhibit other characteristics or combinations of characteristics according to the needs of dentistry training programs. However, it is impractical (and near impossible) to attempt to create artificial models to accurately represent every different possible dental situation that may arise. Consequently the use of generic models may limit the effectiveness of a student's training on a dental simulation machine.

Previous attempts have been made to generate simulation models using actual patient data. In one method, a volumetric model is generated from combining tomographic slices of a CT scan. CT scanning, however, is inconvenient and expensive.

It is an aim of the present invention to mitigate at least some of the drawbacks of the prior art.

SUMMARY OF THE INVENTION

In accordance with a first aspect of the invention, there is provided a computer implemented method of generating a 3D model for dental simulation, comprising: reading a file describing the surface of a 3D object having a volume; generating a voxel grid encompassing the 3D object, wherein the voxel grid contains a plurality of voxels; identifying a subset of voxels of the plurality of voxels which are located within the volume of the 3D object; generating a 3D surface, wherein the 3D surface surrounds the subset of voxels and defines the outer surface of the 3D model; assigning a density value to each voxel in the subset of voxels, wherein the subset of voxels defines the solid volume of the 3D model. Using data relating to a real tooth, the method automatically and efficiently provides a 3D model having density data for use in a dental simulation program.

In accordance with a second aspect of the invention, there is provided a method. The method conveniently utilises the convenience and flexibility of optical scanners to accurately and efficiently construct a solid model for use in a dental simulation environment.

In accordance with a third aspect of the invention, there is provided a dental simulation machine.

Preferable features of the invention are defined in the appended dependent claims.

BRIEF DESCRIPTION OF THE DRAWINGS

The invention will be described with reference to the drawings in which.

DETAILED DESCRIPTION

Figure 1:
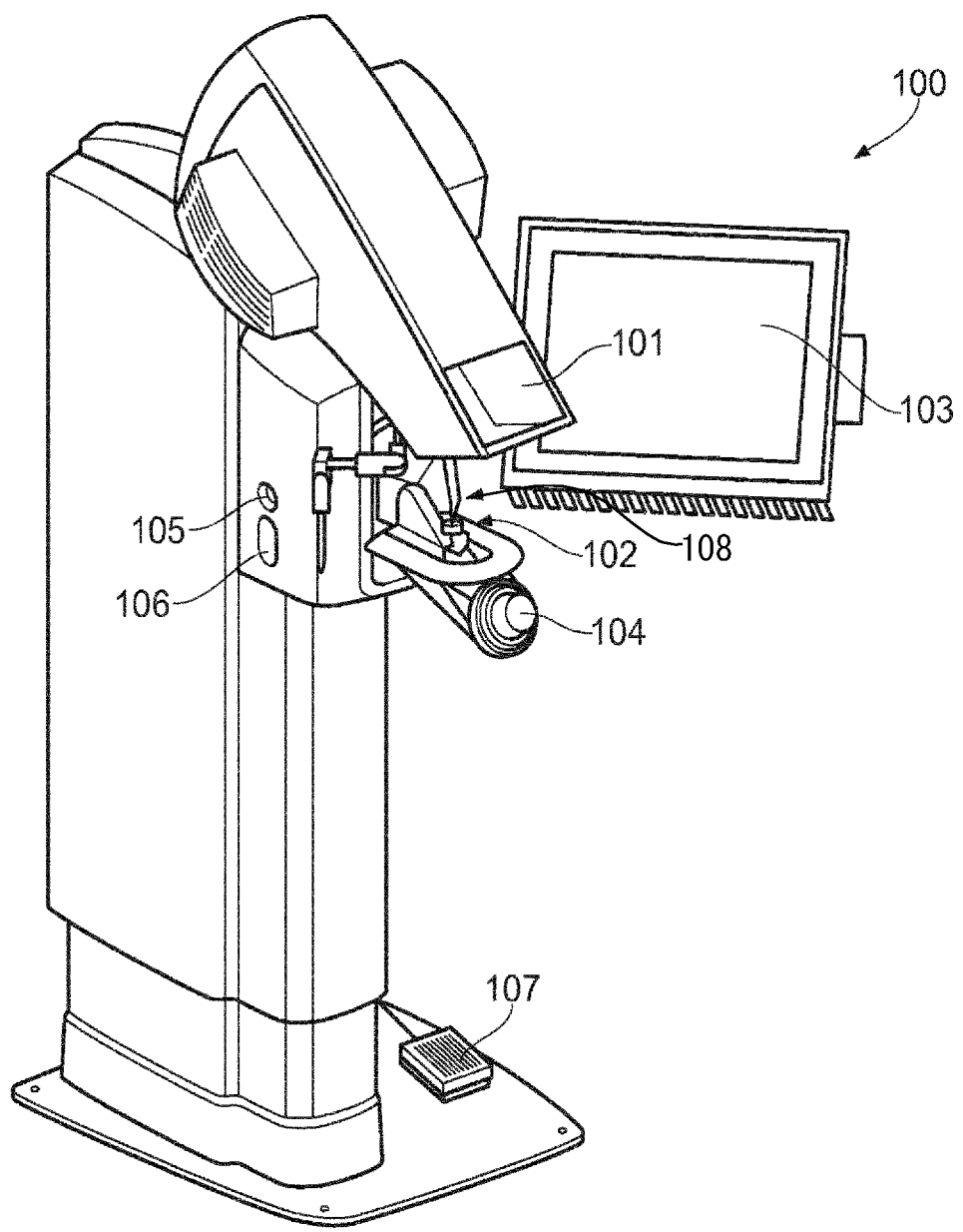
FIG. 1 is a perspective view of a dental simulation machine.

A dental simulation machine is shown generally at FIG. 1. The machine 100 is used by students of dentistry to practice dentistry using virtual reality technology. A student sits on a chair (not shown) facing viewing screen 101. Hand rest 102 defines, generally, an area in which the student operates dentistry hand pieces, such as a dentist's drill. Power button 105 provides machine on/off functionality and height adjustment switch 106 allows the user to adjust the height of a position of the machine 100, including hand rest 102 and viewing screen 101. Viewing screen 101 displays virtual 3D moving images whose movements correspond with movement of a hand piece (which generally resides within area of hand rest 101) by a student. The student views the images on viewing screen 101 wearing passive 3D glasses. Mouse 104 allows the user of the machine to adjust the relative position and orientation of the images on viewing screen 101 in three dimensions. Foot pedal 107 facilitates control of operation of a simulated drill (or other powered dentistry tool).

The machine 100 also comprises training screen 103 (which may be a touch sensitive screen) which is used by the student to access information relevant to their training, such as training programs, individual lessons, scoring and marking data, mentor comments, and to review previous training material. While a simulation process is being performed, the images displayed on viewing screen 101 are also output to training screen 103 to allow an onlooker to view the student's use of the machine.

Figure 2:
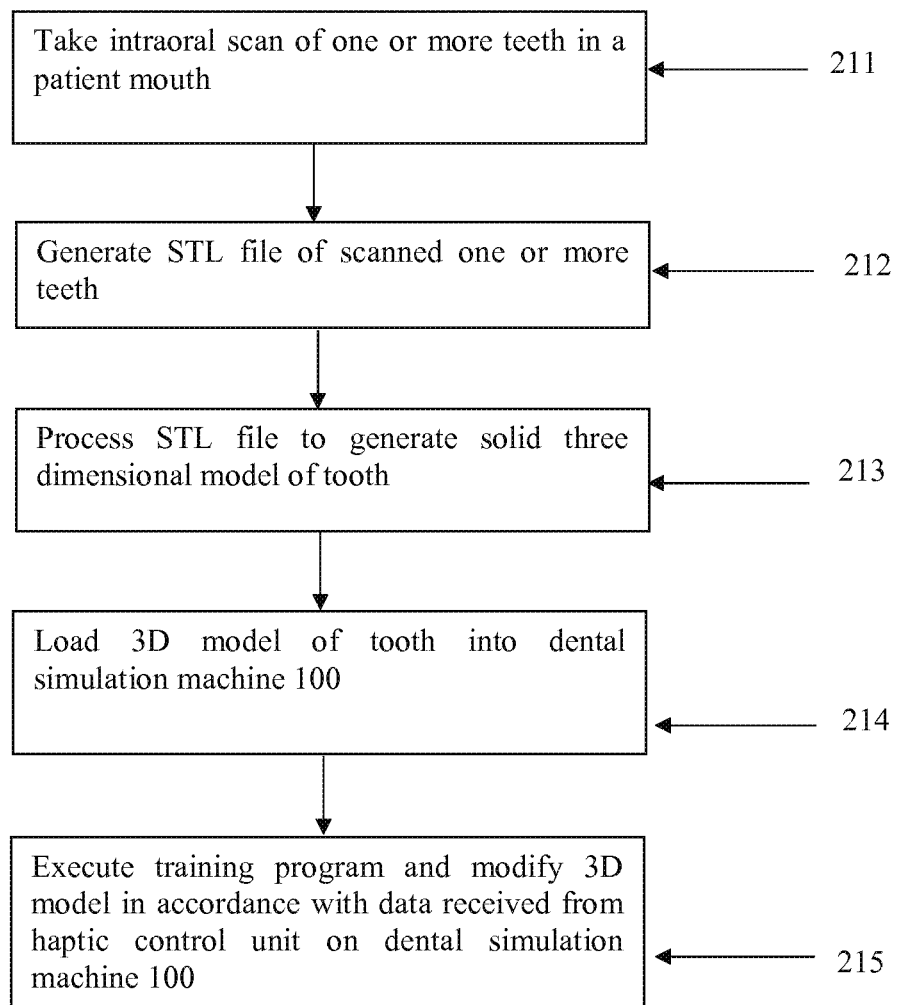
FIG. 2 is flow diagram of the main steps of a 3D imaging process according to an embodiment of the invention.

An overview of the invention will now be described with reference to FIG. 2. At step 211, one or more teeth are scanned using an intraoral scanner. Intraoral scanners are handheld optical scanners that are often used by dentists and other medical professionals to obtain images of teeth and gums prior to, or after, treatment. The images generated by the intraoral scanner allow for areas of the mouth to be viewed in detail, perhaps off-site or at a later time. The images obtained by intraoral scans are conventionally used for visual analysis by dentists to help aid diagnosis or prognosis. In general, intraoral scanning adopts 3D laser scanning techniques, further details of which will be accessible to a person skilled in the art.

At step 212, raw data from an intraoral scanner is converted into an STL format in which the surface geometry of the scanned one or more teeth is represented, as either ASCII or binary, as a mesh comprised of multiple triangles. Further details of the STL file format will be accessible to a person skilled in the art.

Figure 3:
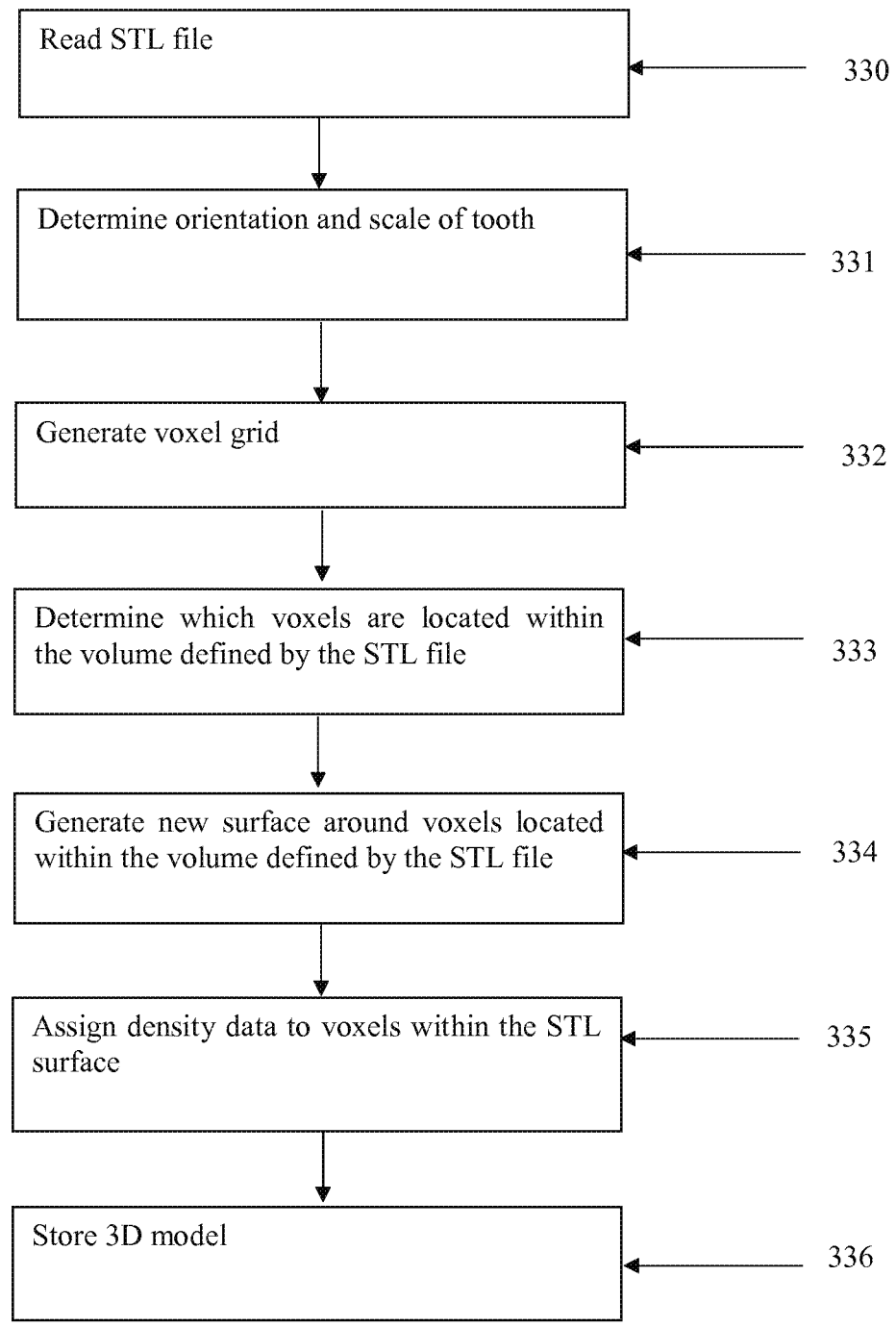
FIG. 3 is a flow diagram of the steps of a method of generating a 3D model according to an embodiment of the invention.

As will be appreciated, whilst an STL file of the tooth scan describes the surface geometry of a three dimensional object, it provides no information concerning its interior. In a particular dentistry simulation, however, a student may be required to drill into or around a tooth and thereby reduce the volume of the tooth. The algorithm described below with reference to FIG. 3 provides a 3D model for use in a dentistry simulation which describes the tooth itself in addition to its surface topology. This is achieved at step 213 of the method of FIG. 2.

At step 214, the 3D model of the tooth or teeth is provided to a dental simulation machine and is accessible to a student, via a user application, as part of a patient-specific training session/lesson, which, similarly to other training sessions, may have a due date stipulating the timescale for completion of the session/lesson and an expiration data stipulating the data on which the patient-specific model may no longer be available to the student. A particular model may be assigned to one or more particular students who may 'log in' to a user application to facilitate loading of the model onto the dental simulation machine that the student is currently using.

Generation of the 3D model preferably occurs in a secure 'tutor environment'. Following creation of the 3D model, but prior to allowing access to the 3D model on a dental simulation machine, a tutor or mentor (for example) may retrieve the 3D model from a library of patient scans and review the model to assess its suitability in a particular lesson or for a particular student. The tutor or mentor, via a case manager program, may therefore decide if and when to allow access to a 3D model from a server, machine or other storage facility.

Figure 4:
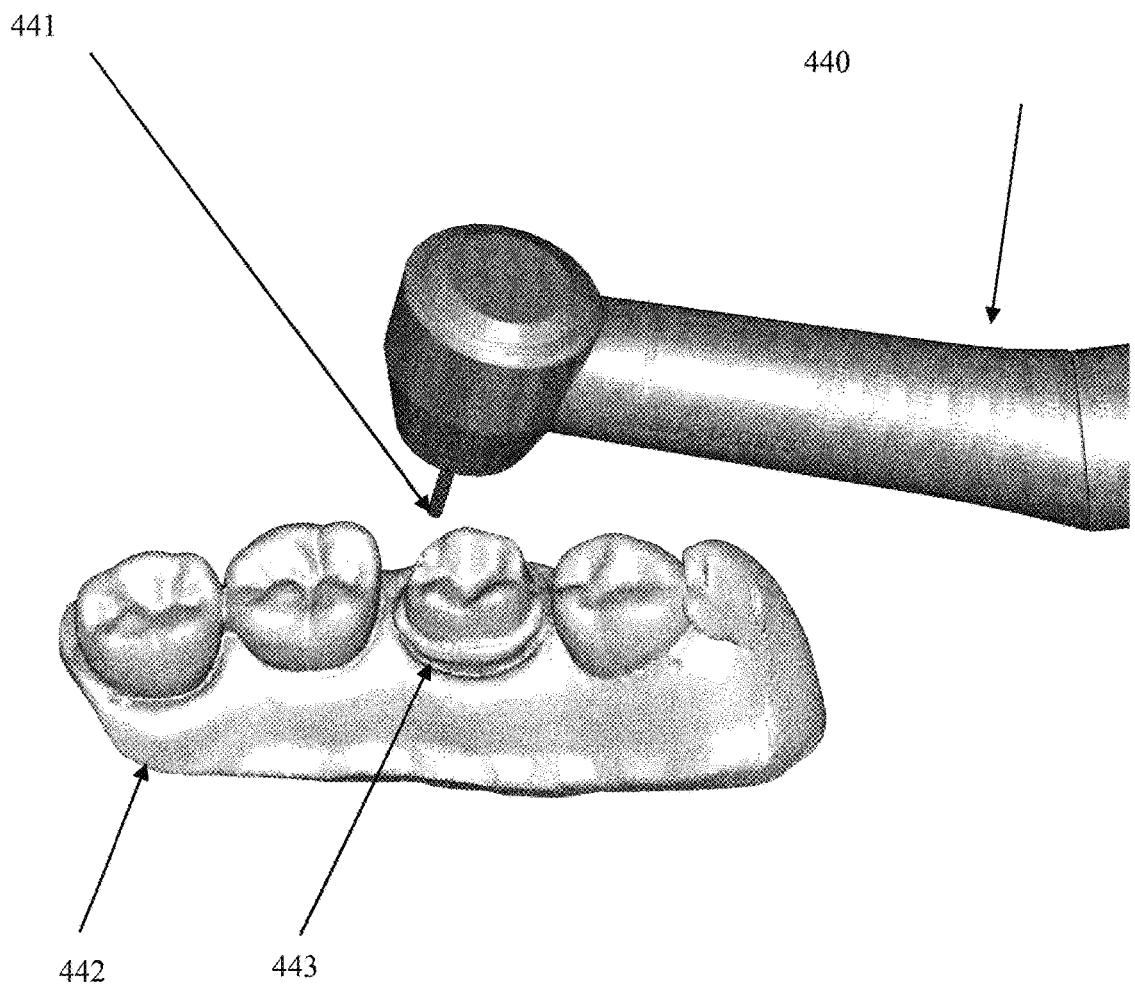
FIG. 4 is an image created according to an embodiment of the invention as viewed by a user on a viewing screen of a dental simulation machine.

Once the 3D model has been 'published' and so made accessible to a student accessing a lesson via the training screen 103 on dental simulation machine 100, the 3D model can be used as part of a simulation program (step 214). An executing simulation program allows the user to view, in 3D, the model on viewing screen 101 and adjust its magnification and orientation. The student physically moves one or more hand pieces 108 as if operating a dentistry tool, such as a drill. FIG. 4 is an image of what a student may typically view during a training exercise. 3D model 442 includes four teeth, one of which is to be manipulated by burr 441 of drill 440. As mentioned above, dental simulation machine 100 provides haptic feedback to a student operating the drill in accordance with their simulated drilling of the 3D model (step 215). As the student drills into the tooth, the program simulates the removal of solid material by appropriately reducing the volume of the tooth. Since teeth have density (and therefore pressure must be applied for the drill to remove material), virtual density is assigned to the interior of the tooth so that the haptic control unit of machine 100 can apply the appropriate resistance to the student through electric motors connected to hand piece 108.

A method of generating the 3D model will be described in further detail with reference to FIG. 3. An STL file of a scanned tooth, as typically provided by an intraoral scanner, is imported into memory and read by a program which executes the algorithm described herein. STL files typically describe closed surface objects—i.e. objects whose surface is closed and connected. Since the scan taken by an intraoral scanner of a tooth is optical, and of course that teeth are connected to gums and jaws, a complete and closed surface scan of a tooth using an intraoral scanner is not possible and such scans will always be 'open', the 'opening' generally lying in a plane parallel to the plane of a jaw. The surface geometry specified in the STL file, is, in accordance with the STL file format, described as a mesh of triangles, the number and relative size of which will depend on the resolution of the intraoral scanner. STL files provide the coordinates of the corners of each triangle. Some STLs files may provide the facet normal of each triangle which makes up the mesh, and some may not. In accordance with known techniques, the normals can be calculated if not provided in the STL file. In an alternative embodiment of the invention, the algorithm to generate a solid 3D model processes an X3D file.

The STL mesh of the tooth is aligned to coordinate axes by generation of an axis-aligned minimum bounding box so that the orientation and scale of the tooth described by the STL file can be determined at step 331. As an alternative, an arbitrarily aligned minimum bounding box may be used. A 3D grid structure of voxels is created from the minimum bounding box at step 332. The relative size of the cubes which comprise the grid define the resolution of the grid. To provide suitable resolution for the haptic control unit, an edge length of 0.2 mm is chosen for each cube of the 3D grid structure.

To determine which voxels, or datapoints, of the 3D grid are within the surface mesh (and therefore essentially comprise the volume of the scanned tooth) and which voxels lie outside of the surface mesh, a virtual raster scan or ray trace along each grid line of the 3D grid (i.e. along each edge of each cube of the 3D grid) in each direction x, y and z is made to identify the points on the grid lines (i.e. cube edges) which intersect with triangles of the STL mesh. Once the intersection points are identified, the datapoints at the vertices of cubes having intersection points are identified. Vertices which are inside the STL mesh are determined using the facet normals of the triangles, the directions of which indicate the outside the surface mesh. The vertices determined to be inside the STL mesh consequently identify voxels which are deemed to lie inside the STL mesh (step 333).

STL meshes must be closed in order to be used in practice. Since the STL mesh of a scanned tooth is 'open', it is necessary to approximate a closed mesh. The ray-traced intersection points in two dimensions provide sufficient data for the closing to be approximated. For example, if the opening is in the z-y plane, ray tracing in the x direction may yield only 1 intersection point (rather two, as would be the case for a closed mesh). However, ray tracing in the z and y dimensions will yield two intersection points respectively and this is sufficient to approximate a closing in the z-y plane.

A lookup table as described by the original marching cubes algorithm is used to provide a set of triangles for a cube according to which vertices of the cube are inside and outside the STL mesh. In this way, the points of intersection are used to generate a new surface mesh of triangles which bounds the voxels located within the STL surface (step 334). This creates a virtual construction defining the outer surface of the 3D model for graphical and haptic rendering. Unlike the triangles of the STL surface, the new surface has a specified resolution in conformance with the size of the cubes in the 3D grid.

Voxels which were found to be inside of the STL mesh are assigned a density value at step 335. For computational efficiency, all relevant voxels (i.e. those inside the mesh) are assigned the same density, the value of which denotes enamel. When a student virtually drills into the 3D model, the feedback to the student, as controlled via the haptic control unit, will be appropriate to simulate the drilling of enamel.

However, teeth are comprised of 'layers' of different material having different densities and so the density of a particular tooth varies through a cross section. In an alternative embodiment, this variation in density is simulated in a virtual tooth as used in a training program on the simulation machine so that when a trainee dentist performs a simulated drilling, the response from the haptic control unit of the simulation machine is adjusted according to the assigned density values of the layer of the tooth being drilled. To do this, different voxels are assigned different density values depending on their location. For example, voxels located towards the outer shell of the 3D model may be assigned enamel density values, but voxels located further towards the centre of the tooth may be assigned a density value consistent with dentin, which is softer than enamel. In this way, the 3D model has density data consistent with the structure of a tooth so that the simulation of drilling into the tooth is realistic. Once density values have been assigned, the 3D model can be loaded onto a dental simulation machine 100.

Some intraoral scanners provide colour data. In one embodiment, colour data is applied to the surface of the 3D model in accordance with the scan data. Colour data may also be applied to voxels to more closely represent the interior of a tooth.

Figure 5A:
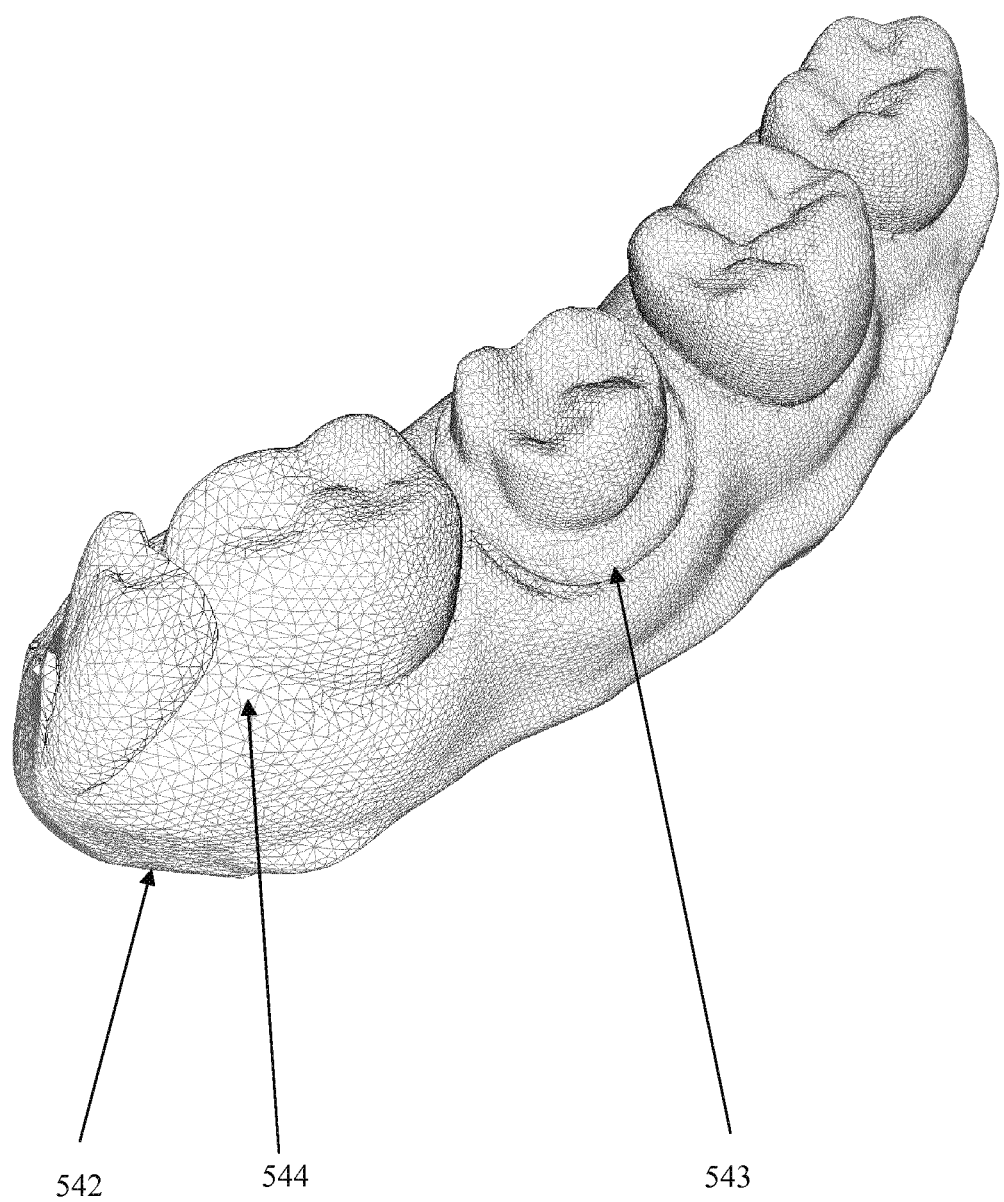
FIG. 5a is a triangulated mesh surface image of a set of teeth.
Figure 5B:
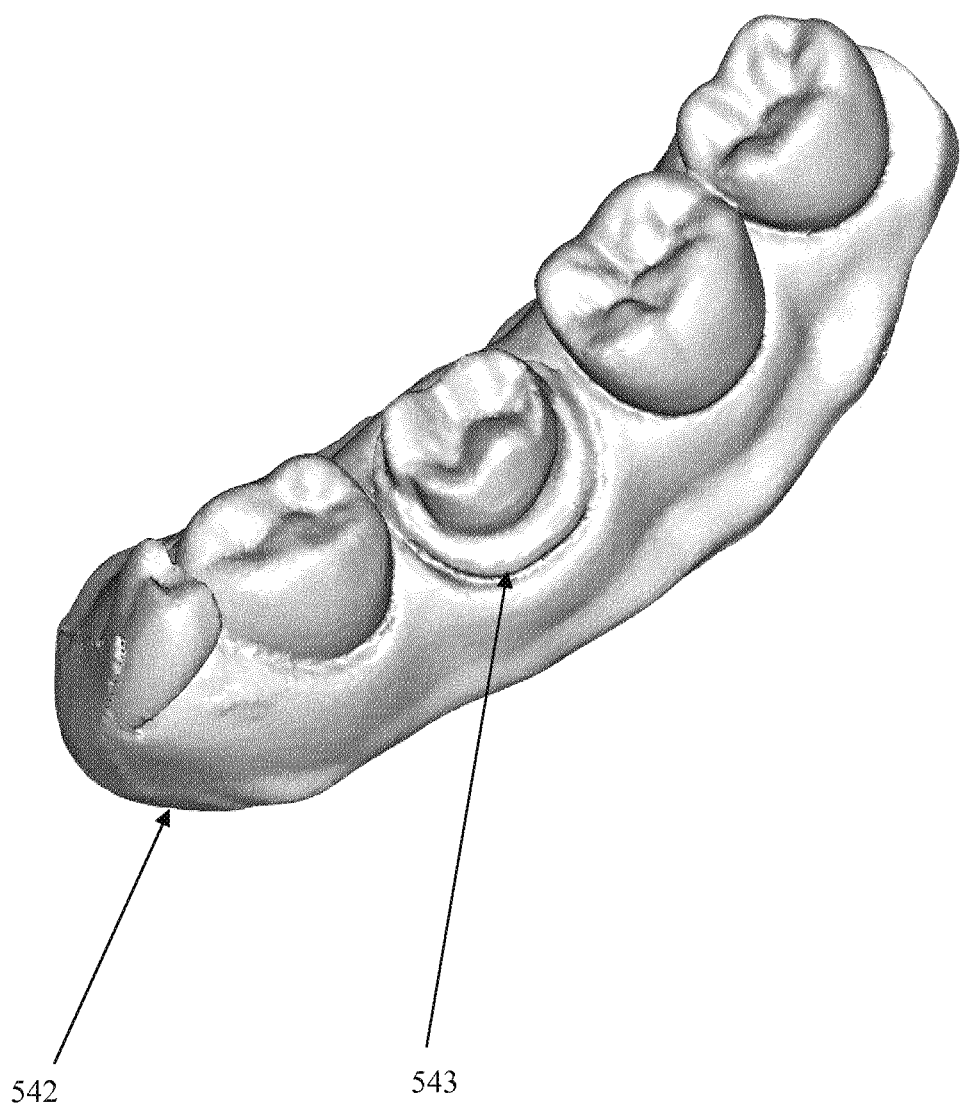
FIG. 5b is an image of the teeth shown in FIG. 5a, generated according to an embodiment of the invention.
Figure 6A:
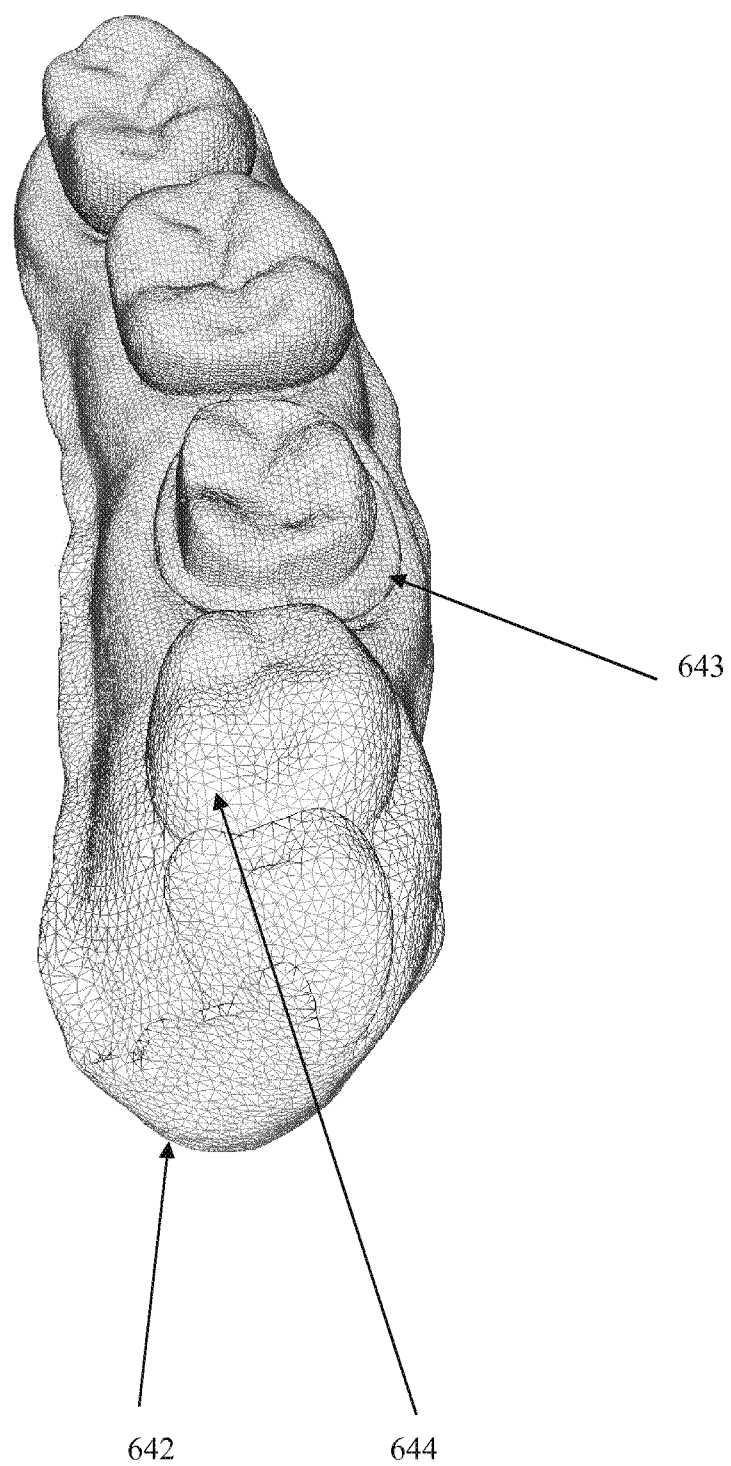
FIG. 6a is a triangulated mesh surface image of the set of teeth of FIGS. 5a and 5b, rotated relative to FIGS. 5a and 5b.
Figure 6B:
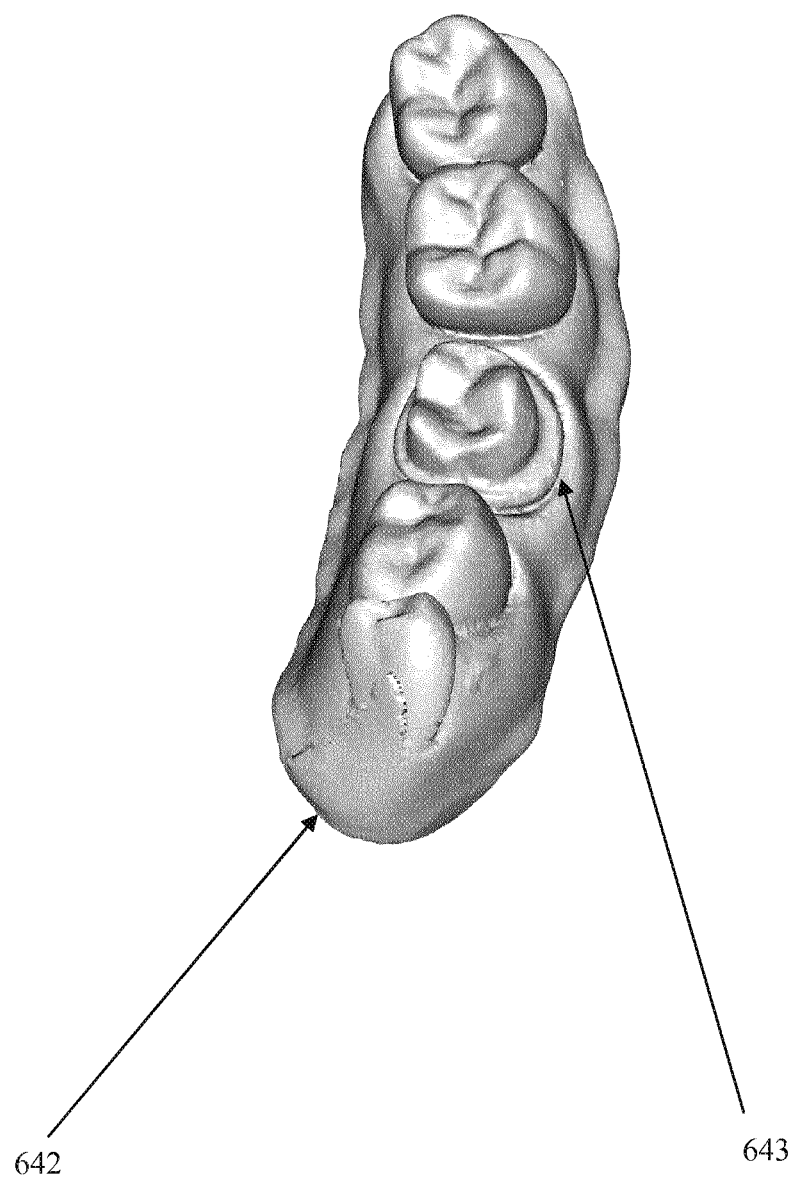
FIG. 6b is an image of the teeth as shown in FIG. 6a, generated according to an embodiment of the invention.

FIGS. 5*a*, 5*b*, 6*a* and 6*b* show a set of four teeth, one of which requires a replacement crown. During a simulation, a student may be required to drill around the base of the crown 543 and 643 to provide an indentation into which a new crown (not shown) can be secured (as shown in FIG. 4). FIGS. 5*a* and 5*b* show surface meshes of a set of four teeth 542 and 642 including triangles 544 and 644 generated using the intersection points. FIGS. 5*b* and 6*b* show the corresponding finished grayscale 3D models.

Figure 7:
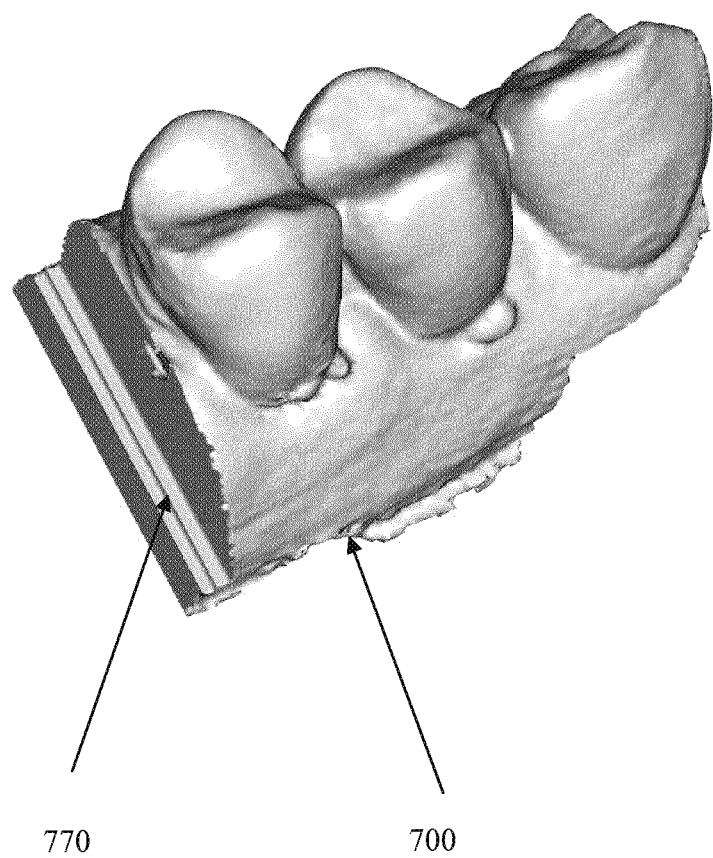
FIG. 7 is an image of a three teeth generated according to an embodiment of the invention

The larger the area scanned by an intraoral scanner (i.e. the higher the number of teeth) the greater the processing requirement to generate a 3D model in the manner described with reference to FIG. 3. In one embodiment, a region of interest of a scan represented by an STL can be extracted for processing to create a 3D model—i.e. only a portion of the STL file is used. For example, a dental technician, mentor or tutor may review the image provided by the STL file to determine that only one of a plurality of teeth scanned is needed. FIG. 7 shows a 3D model 700 of a set of three teeth which has been generated from an STL file which included further teeth.

The invention claimed is:

1. A computer-implemented method of generating a 3D model for dental simulation, comprising:
    reading a STL file describing the surface of a 3D object as a mesh of triangles having a volume, wherein the 3D object represents a tooth;
    generating a voxel grid encompassing the 3D object, wherein the voxel grid contains a plurality of voxels;
    identifying a subset of voxels of the plurality of voxels which are located within the volume of the 3D object, wherein identifying the subset comprises:
        raster scanning each grid line of the voxel grid to identify points on cube edges which intersect with surface triangles of the 3D object;
        determining vertices of the cubes having the intersection points;
        determining which of the vertices are inside the triangulated surface of the 3D object described by the STL file based on a direction of facet normal of each triangle of the triangulated surface; and
        identifying the subset of voxels which are located within the volume of the 3D object based on the vertices of the cubes determined as inside the triangulated surface of the 3D object;
    generating a triangulated surface mesh using the intersection points, wherein the triangulated surface mesh surrounds the subset of voxels and defines the outer surface of the 3D model;
    assigning a density value to each voxel in the subset of voxels, wherein the subset of voxels defines the solid volume of the 3D model, wherein different voxels in the subset of voxels have different density values; and
    loading the 3D model into a dental simulation machine.

2. The method of claim 1, wherein the file describes the surface geometry of one or more real teeth.

3. The method of claim 1, further comprising outputting the 3D model to a display on the dental simulation machine.

4. The method of claim 1, further comprising loading the 3D model into a simulation program.

5. The method of claim 1, wherein the volume of each cube in the voxel grid is 0.2 mm$^3$.

6. The method of claim 1, wherein the step of generating a voxel grid comprises generating an axis-aligned minimum bounding box around the 3D object.

7. The method of claim 1, further comprising extracting a portion of the STL file and generating a 3D model based on the extracted portion only.

8. A non-transitory machine readable storage medium storing instructions which, when executed by a processor, perform the method according to claim 1.

9. A dental simulation machine comprising
    means for selecting a 3D model generated in accordance with the method of claim 1 for use in a dentistry training software program;
    means for displaying on a viewing screen, during execution of a training program, the selected 3D model.

10. The dental simulation machine of claim 9, further comprising means for generating instructions to modify the 3D model during execution of the training program.

11. A device configured to perform the method of claim 1.

* * * * *